2,900,235
Patented Aug. 18, 1959

2,900,235

REDUCED PHOSPHOMOLYBDIC ACIDS WHEREIN THE AVERAGE VALENCE OF THE MOLYBDENUM IS NOT MORE THAN 4

Herrick R. Arnold, Frank S. Fawcett, and Walter W. Gilbert, Wilmington, Del., assignors to E. I. du Pont de Nemours and Company, Wilmington, Del., a corporation of Delaware No Drawing. Application August 19, 1955
Serial No. 529,575

6 Claims. (Cl. 23—139)

This invention relates to new compositions of matter, to their preparation and to their use as catalysts. More particularly, this invention relates to novel catalytic compositions, to methods for their preparation and to their use as catalysts for the hydrogenation of carbon monoxide to high molecular weight, normally solid hydrocarbons.

This application is a continuation-in-part of our copending patent application Serial No. 368,487, filed July 16, 1953, now Patent Number 2,825,704.

Phosphomolybdic acids and their ammonium salts are commercially available products. It has been found that if these phosphomolybdic acids and ammonium phosphomolybdates are reduced under rigidly controlled conditions there are obtained novel compositions which possess unique catalytic properties for the hydrogenation of carbon monoxide to high molecular weight, normally solid, hydrocarbons.

It is an object of this invention to provide novel phosphomolybdic compounds and a method for their preparation. A further object is to provide a novel catalytic process for converting carbon monoxide to normally solid, high molecular weight, hydrocarbon polymers. Another object is to provide novel phosphomolybdic compounds which are effective as catalysts in the hydrogenation of carbon monoxide at relatively low pressures to normally solid, high molecular weight, polymethylenes. Other objects will appear hereinafter.

These objects are accomplished in accordance with the present invention by providing novel phosphomolybdic compounds represented by the formula $P_2Mo_{20-24}O_{2-60}$. These phosphomolybdic compounds are the products obtained by reducing phosphomolybdic acids or their ammonium salts under selected and controlled conditions. It has now been discovered that reduced products corresponding in chemical composition to $P_2Mo_{20-24}O_{2-60}$ are obtained by reducing phosphomolybdic acids or their ammonium salts at temperatures within the range of 350° to 600° C., during a 5- to 60-hour reduction period with hydrogen at a space velocity of 500 to 1500 reciprocal hours.

This invention also includes the use of the above reduced phosphomolybdic compositions as catalysts for the hydrogenation of carbon monoxide to normally solid, high molecular weight hydrocarbons by heating and reacting carbon monoxide and hydrogen at a temperature of 125° to 350° C. under a pressure of at least 10 atmospheres in contact with a catalytic amount of a reduced phosphomolybdic composition corresponding to the formula $P_2Mo_{20-24}O_{2-60}$.

The phosphomolybdic acids used as starting materials for preparation of the reduced phosphomolybdic compounds of this invention are commercially available materials and contain phosphorus to molybdenum ratios of 1:10 to 1:12. Other phosphomolybdic acids containing phosphorus to molybdenum ratios outside this range, for example, those in which this ratio is as low as 1:2.5 give reduced products in accord with this invention. The ammonium salts of these phosphomolybdic acids are made by methods well known to those skilled in the art and can be used as equivalent starting materials for the acids.

In producing the reduced phosphomolybdic acids and reduced ammonium phosphomolybdates, the phosphomolybdic acid or its ammonium salt employed as the starting material is placed in a heat-resistant glass tube mounted within an electric furnace, and hydrogen alone, or hydrogen admixed with a diluent gas, such as nitrogen or carbon monoxide, is passed over the charge at atmospheric pressure at a rate corrresponding to a space velocity which is desirably in excess of 500 reciprocal hours, while the temperature is raised from room temperature to above 350° C. at the rate of 50° to 85° C. per hour. The reduction is continued under these conditions within the range of 350° C. to 600° C. for at least five hours. Thereafter the charge is permitted to cool to room temperature in non-oxidizing atmosphere, flushed at room temperature with nitrogen, and the reduced phosphomolybdic acid is stored under nitrogen, helium, or other inert gas.

The composition of the reduced phosphomolybdic acids, or ammonium phosphomolybdates depends upon the reduction conditions used within the ranges herein disclosed.

The examples which follow are submitted to illustrate and not to limit this invention. Surface area was measured by the B.E.T. method described in Am. Soc. for Testing Materials, March 4, 1941, "Symposium on New Methods for Particle Size Determination in the Subsieve Range."

EXAMPLE I

Commercial, analytical grade phosphomolybdic acid of composition by analysis corresponding to the formula $2(H_3PO_4).22MoO_3.49H_2O$ was dehydrated to constant weight by heating at 200° C. The theoretical yield of anhydride assuming the reaction

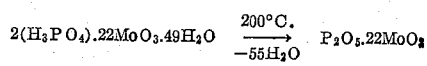

is 77%. Actual yields varied within the limits 77–78%. The anhydride was hygroscopic and was stored in tightly sealed containers.

One hundred milliliters (ca. 150–170 g.) of the anhydrous granular phosphomolybdic acid was placed in a 45 mm. Pyrex tube, 34 inches long, with ground glass fittings on each end providing for a hydrogen inlet and exit, and a Pyrex thermocouple well penetrating through the catalyst bed. The catalyst rested on a plug of Pyrex glass wool. The reduction tube was placed in a split-type furnace, 18 inches long mounted at an angle of about 10° from horizontal.

Standard cylinder hydrogen was passed first through activated charcoal and then over copper at 400° C. to a drying train consisting of a series of anhydrous calcium sulfate towers, followed by $P_2O_5$ driers, and then to the reduction tube. The hydrogen passed through the catalyst bed at a space velocity of 1000 hrs.$^{-1}$ and thence to a condenser and dryer arranged to collect and measure water formed during reduction. Hydrogen flow was started at room temperature and the furnace was heated up to 400° C. (catalyst bed temperature) in a period of 4.5 to 5.0 hours and held at 400° C. for 41 hours. The furnace was then cooled to room temperature with hydrogen flowing at a diminished rate. At room temperature, the system was flushed with deoxygenated nitrogen and the reduced catalyst was discharged directly into a specially designed Pyrex glass dispenser under nitrogen from which samples were drawn through a large bore stopcock into glass tubes in an atmosphere of nitrogen and sealed with a torch.

As reduction proceeded, the catalyst passed through a series of visible color changes starting from yellow at room temperature, changing to dark green about 250° C., to deep blue around 350° C., and finally to black at 400° C. Water formed during reduction did not appear in significant amounts below 400° C.

The black, pyrophoric, reduced phosphomolybdic acid analyzed 73.37, 75.27% molybdenum and 2.10, 2.06% phosphorus, was amorphous to X-rays, and had a surface area of 195 sq. m./g. Its average composition corresponded to $P_2Mo_{22}O_{42}$.

EXAMPLE II

Example I was repeated, except that the reduction was effected at 500° C. for 24 hours. The pyrophoric product analyzed 80.75% molybdenum and 2.34% phosphorus. Its average composition corresponded to $P_2Mo_{22}O_{27}$.

EXAMPLE III

One hundred seventy-five grams (ca. 160 cc.) of yellow crystalline phosphomolybdic acid, corresponding in composition to $P_2O_5.22MoO_3.56H_2O$, was placed in a heat-resistant glass tube mounted in an electric furnace. Hydrogen at the rate of 160 liters per hour, equivalent to a space velocity of 1000 hrs.$^{-1}$, was passed through the tube at essentially atmospheric pressure. The system was then heated up from room temperature to 400° C. at the rate of about 75° to 80° C. per hour, and held under these conditions for 19 hours. During the heating up period in the temperature range of 100° to 200° C. the water of crystallization was removed, the acid turning light green at this point. In the interval 200° to 350° C. no further water was removed and no significant change in appearance was noted. At about 375° C. reduction started and was accompanied by evolution of water, and a gradual change in color from light green to deep blue and finally to black occurred. After reduction for 19 hours, the product was cooled to room temperature in hydrogen, flushed at room temperature with nitrogen, discharged and sealed under nitrogen.

The black reduced, pyrophoric product analyzed 75.70, 75.53% molybdenum and 2.18, 2.22% phosphorus, which corresponds to $P_2Mo_{22}O_{39}$. It had a surface area of 157 sq.m./g. The X-ray diffraction pattern of this black reduced product indicated that it was essentially amorphous.

EXAMPLE IV

A sample of the phosphomolybdic acid, described and employed in Example III as the starting material, was first dehydrated by heating to constant weight at 200° C. The anhydrous powder was then reduced in hydrogen for 18 hours at 400° C. under the conditions described in Example III. The reduced product was black, pyrophoric, and substantially amorphous to X-rays. Elementary analysis showed the product to contain 71.51, 71.57% molybdenum and 2.16, 2.17% phosphorus, which corresponds to $P_2Mo_{21}O_{47}$.

EXAMPLE V

Reduction of the anhydrous phosphomolybdic acid of Example I, under conditions described in Example III, substituting in place of hydrogen, a gaseous mixture comprising two volumes of $H_2$ and one volume of CO, yielded a catalytically active black, pyrophoric product analyzing 73.52% (average) molybdenum and 2.075% (average) phosphorus, which corresponds to $P_2Mo_{23}O_{41}$. The product also contained approximately 2% carbon and 0.27% hydrogen.

EXAMPLE VI

Ammonium phosphomolybdate $(NH_4)_6P_2Mo_{24}O_{80}$ was precipitated at a pH of 1 to 2 from a 10% aqueous solution of phosphomolybdic acid by the addition of 28% aqueous ammonia. The ammonium salt so prepared was reduced at atmospheric pressure and 400° C. in hydrogen at a space velocity of 1000 reciprocal hours for 24 hours. The reduced product corresponded in composition to $P_2Mo_{22}O_{48}$ and was black, amorphous to X-rays, pyrophoric, and had a surface area of 233 sq.m./g.

EXAMPLE VII

Example I was repeated, except that the reduction was effected by raising the temperature of the catalyst bed to 550° C. over a period of 23 hours and maintaining the temperature at 550° C. for 24 additional hours. The analysis of the steel gray, highly pyrophoric product was: 95.22% Mo; 2.67% P; surface area, 51.3 sq. m./g., which corresponds to a composition $P_2Mo_{23}O_3$.

EXAMPLE VIII

Example I was repeated, except that the temperature of reduction was raised to 600° C. over a period of 23 hours and maintained at 600° C. for 24 additional hours. The pyrophoric product had the following analysis: 95.89% Mo; 2.69% P; surface area, 35 sq. m./g., corresponding to the composition $P_2Mo_{23}O_2$.

EXAMPLE IX

Example I was repeated, except that the time of reduction at 400° C. was 60 hours. The black, pyrophoric product had the following analysis: 74.95% Mo; 2.13% P; surface area, 151 sq. m./g., corresponding to a composition $P_2Mo_{23}O_{42}$.

EXAMPLE X

Example I was repeated, except that the temperature of the reduction was 475° C. for 48 hours. The analysis of the pyrophoric product was as follows: 87.32% Mo; 2.37% P; surface area, 163 sq. m./g., corresponding to a composition $P_2Mo_{24}O_{17}$.

The reduced phosphomolybdic acid and reduced ammonium phosphomolybdates of this invention are effective catalysts for hydrogenating carbon monoxide to high molecular weight, normally solid polymethylenes as illustrated by the following examples wherein inherent viscosity refers to measurements made at 0.1% concentration in tetrahydronaphthalene at 125° C. All of these hydrogenations were effected in a 400 cc. reactor, except for Example XII in which a 190 cc. reactor was used.

EXAMPLE XI

A pressure reactor was charged with 100 cc. of xylene and 10 g. of a reduced phosphomolybdic acid prepared as in Example III ($P_2Mo_{22}O_{39}$). The charge was then heated at 225° C. under 1000 atmospheres of 2:1 hydrogen/carbon monoxide mixed gas. During 15 hours a gas absorption of 285 atmospheres occurred. The crude reaction product contained hard lumps of solid, and, in addition, some fluffy white polymer. The mixture was filtered and dried. The product was then extracted with benzene, yielding a trace of solid material. Further extraction with boiling xylene, followed by dilution of the extract with methanol, yielded 2.0 g. of fibrous white solid polymer having an inherent viscosity of 2.76 and a melting point of 127° to 132° C. This polymer was manually spun to give fibers which could be cold drawn. It was compression molded at 190° C. to give colorless transparent films which were flexible, stiff, and tough.

The above experiment was repeated using the reduced phosphomolybdic acid of Example IV ($P_2Mo_{21}O_{47}$), as the catalyst. Under these conditions the pressure drop amounted to 170 atmospheres. After extraction of the product with benzene, to remove traces of soluble material, the residue was extracted with boiling xylene and on dilution of the extract with methanol there was obtained 1.52 g. of a white solid polymethylene having an inherent viscosity of 2.85. This polymer yielded very tough molded objects and films.

EXAMPLE XII

A mixture of 50 cc. of xylene and 11 g. of the reduced phosphomolybdic acid of Example IV ($P_2Mo_{21}O_{47}$) was heated for 3.5 hours at 200° C. under a pressure of 3000 atmospheres of a 2:1 hydrogen/carbon monoxide mixed gas. After extraction of the solid product with benzene, which removed traces of soluble material, the residue was extracted with boiling xylene. The xylene extract was then diluted with methanol. There was obtained 1.51 g. of a polymethylene having an inherent viscosity of 2.46.

EXAMPLE XIII

A mixture of 100 cc. of water and 13 g. of the reduced phosphomolybdic acid of Example IV ($P_2Mo_{21}O_{47}$), was heated at 275° C. for 15 hours under a 2:1 hydrogen/carbon monoxide gas pressure of 1000 atmospheres. Benzene extraction to remove soluble material, followed by extraction of the residue with boiling xylene and dilution of the extract with methanol, gave 2.70 g. of a polymethylene.

EXAMPLE IV

A mixture of 100 cc. of xylene, 10 g. of anhydrous ammonia, and 11.6 g. of the reduced phosphomolybdic acid of Example IV ($P_2Mo_{21}O_{47}$), was heated at 275° C. under a 2:1 hydrogen/carbon monoxide mixed gas pressure of 1000 atmospheres. After 15 hours the gas absorption corresponded to a pressure drop of 565 atmospheres. Benzene extraction of the product to remove soluble material, followed by extraction with boiling xylene and dilution of the extract with methanol yielded 1.91 g. of white solid polymer.

EXAMPLE XV

A mixture of n-propyl alcohol, 5 g. of anhydrous potassium carbonate, and 21.3 g. of the reduced phosphomolybdic acid of Example IV ($P_2Mo_{21}O_{47}$), were heated at 275° C. for 15 hours under 1000 atmospheres of 2:1 hydrogen/carbon monoxide mixed gas. The crude reaction product was separated into a solid and a liquid portion by filtration. The solid was extracted with boiling benzene and on evaporation of the extract there was obtained 1.3 g. of a brown wax. This wax analyzed:

Analysis.—Calc'd for $(CH_2)_n$: C, 85.70; H, 14.30. Found: C, 83.22; H, 14.09.

Further extraction of the benzene insoluble portion with boiling xylene, followed by dilution with methanol yielded 5.43 g. of a polymethylene having an inherent viscosity of 1.04. This product analyzed 85.23% C, and 14.66% H.

Distillation of the crude liquid fraction gave 24 g. of material boiling in the range of 69° to 82° C. and 5.8 g. of residue boiling higher than n-propyl alcohol.

EXAMPLE XVI

A mixture of 100 cc. of xylene and 14.5 g. of the reduced phosphomolybdic acid of Example V ($P_2Mo_{23}O_{41}$), was heated at 275° C. under a 2:1 hydrogen/carbon monoxide mixed gas pressure of 1000 atmospheres. During 15 hours a gas absorption corresponding to 1585 atmospheres was observed. The crude product separated into two layers. After evaporation of the xylene solvent from the upper layer, there was obtained 1.3 g. of wax. Extraction of the crude solid with refluxing benzene, followed by precipitation with methanol, yielded a trace of solid. Subsequent extraction with boiling xylene gave 1.72 g. of a polymethylene.

EXAMPLE XVII

A mixture of 100 cc. of xylene and 35 g. of the reduced ammonium phosphomolybdate of Example VI ($P_2Mo_{22}O_{48}$), was heated at 275° C. under a 2:1 hydrogen/carbon monoxide mixed gas pressure of 1000 atmospheres. During a 9.75-hour reaction time the pressure drop corresponded to 810 atmospheres. After extraction of the solid product with boiling benzene to remove soluble material, the residue was extracted with boiling xylene to yield 5.86 g. of solid polymer having an inherent viscosity of 1.60.

EXAMPLE XVIII

A mixture of 100 cc. of xylene and 4.8 g. of reduced phosphomolybdic acid of Example I ($P_2Mo_{22}O_{42}$), was heated over a temperature range of 100-275° C. under a 1:1 hydrogen/carbon monoxide mixed gas pressure of 50-200 atmospheres for 12 hours. The total pressure drop during this period corresponded to 50 atmospheres. The solid product was extracted with boiling benzene for two days to remove 0.21 g. of waxy polymer, followed by extraction with boiling xylene to yield 1.06 g. of solid polymer having an inherent viscosity of 1.80.

EXAMPLE XIX

A mixture of 100 cc. of xylene and 7.0 g. of reduced phosphomolybdic acid, prepared according to Example I ($P_2Mo_{22}O_{42}$), was heated at 100-250° C. under 33.4 to 170 atmospheres' pressure of a 1:1 hydrogen/carbon monoxide mixed gas for 12 hours. The pressure drop during this period amounted to 49 atmospheres. The solid product was extracted with boiling benzene to remove a trace of waxy product, and with boiling xylene to yield 0.75 g. of high molecular weight polymethylene, having an inherent viscosity of 2.31.

This experiment was repeated at 200° C. and 167 atmospheres' pressure. There was obtained 0.44 g. of polymethylene of inherent viscosity 2.58.

Repetition of the above experiment at 50 and 33 atmospheres, yielded high molecular weight polymethylenes, thus showing that these catalyst compositions are active even under mild conditions.

EXAMPLE XX

The preparation of Example XVIII was repeated, except that the conditions of operation were 275° C. and 71.7 to 111.7 atmospheres' pressure. There were obtained high molecular weight polymethylene, 0.40 g., having an inherent viscosity of 1.85, and a slight trace of wax.

EXAMPLE XXI

The preparation of Example XIX was repeated, except that the temperature range was 100-225° C. at 33.4 to 133.6 atmospheres' pressure of a 2:1 hydrogen/carbon monoxide gas mixture. These was obtained 0.5 g. of polymethylene possessing an inherent viscosity of 1.49.

EXAMPLE XXII

The preparation of Example XVIII was repeated, except that the hydrogen/carbon monoxide mixed gas was in the ratio of 1:2. There was obtained 1.21 g. of solid polymethylene exhibiting an inherent viscosity of 1.47.

EXAMPLE XXIII

The preparation of Example XVIII was repeated, except that the hydrogen/carbon monoxide mixed gas was in the ratio of 1:3. There was obtained 0.89 g. of solid polymethylene of inherent viscosity of 1.43.

EXAMPLE XXIV

The preparation of Example XIX was repeated, employing a catalyst of composition corresponding to $P_2Mo_{24}O_{17}$ (Example X). The solid product comprised a trace of wax and 0.23 g. of high molecular weight polymethylene.

EXAMPLE XXV

A mixture of 100 cc. of xylene, 5.1 g. of a catalyst composition corresponding to $P_2Mo_{23}O_2$ (Example VIII) was heated at 245-275° C. under a 1:1 hydrogen/carbon monoxide gas pressure of 850–1000 atmospheres. During a 12-hour reaction period there was an observed pressure drop of 787 atmospheres. The product consisted of 1.33 g. of waxy solid and 1.36 g. of high molecular weight, xylene-extracted polymer.

EXAMPLE XXVI

The preparation of Example XXI was repeated employing as a catalyst the product of Example VII ($P_2Mo_{23}O_3$). There was observed a pressure drop of 38.3 atmospheres and the product was high molecular weight polymethylene.

The phosphomolybdic acids and their ammonium salts used as starting materials in preparing the reduced phosphomolybdic acids of this invention are hydrates of compounds comprehended by the formula $$H_x(NH_4)_y P_2Mo_{20-24}O_{68-83}$$

wherein $x$ is zero through 12 and $y$ is zero through 10. In the reduction, the ammonium salts behave essentially the same as the free acids. The products obtained by reducing the ammonium salts show by analysis only a very small amount of nitrogen, e.g., of the order of about 1%.

In the reduction, hydrogen alone or hydrogen admixed with a diluent gas, e.g., nitrogen or carbon monoxide, is permitted to pass at atmospheric pressure over the heated phosphomolybdic acid or ammonium salt (not metal) at a space velocity which is at least 500 hrs.$^{-1}$. Usually the space velocity is between 700 and 1100 hrs.$^{-1}$ because under these conditions good reduction rates, under the preferred temperature conditions, are realized.

The reduction is effected at atmospheric pressure with hydrogen alone or with hydrogen admixed with a diluent gas such as nitrogen or carbon monoxide at a temperature which is at least 350° C. and usually above 375° C. but not more than 600° C. As a rule, however, the reduction is effected at 400° to 550° C.

The reduction is conducted until the average valence of the molybdenum as determined by permanganate titration is not more than 4 as in Example IV or less than 4 as in the other examples. The time required to effect this depends upon the composition of the reducing gas and the temperature used. As a rule it is at least 5 hours but not more than about 60 hours. Under the preferred operating temperature conditions of 400°–475° C., and with hydrogen alone as the reducing gas, the time of reduction generally will be between 18 and 40 hours.

The composition of the reduced phosphomolybdic acid corresponds to $P_2Mo_{20-24}O_{2-60}$ wherein the average valence of the molybdenum is not more than 4. Within the preferred operating temperature range of 400°–475° C. and an 18–40 hour reduction time, the reduced phosphomolybdic acids will correspond to $P_2Mo_{20-24}O_{38-60}$. With longer periods of reduction up to 60 hours or higher temperatures up to 600° C., the reduced phosphomolybdic acids will correspond to $P_2Mo_{20-24}O_{2-37}$.

The hydrogenation of carbon monoxide can be carried out as a batch operation, or as a semi-continuous, or as a continuous upflow, down-flow, or counter-current operation. It can also be carried out co-currently or as a boiling bed or fluidized catalyst operation.

The mole ratio of hydrogen to carbon monoxide in the gas mixture may vary from 5:1 to 1:10. Usually mole ratios of from 3:1 to 1:2 are used because gas mixtures in this range of composition are ordinarily available in large scale and give optimum results from the standpoint of desired high molecular weight hydrocarbon polymer.

The temperature at which the hydrogenation of the carbon monoxide is effected lies in the range of 125° to 350° C. Because good reaction rates with best yields of desired high molecular weight hydrocarbons are obtained in the range of 150° to 275° C., this range embraces the preferred operating temperature conditions.

The hydrogenation of the carbon monoxide is effected under a total pressure which is at least 10 atmospheres. Because better yields of desired high molecular weight hydrocarbons, with maximum utilization of the carbon monoxide and hydrogen is obtained employing pressures in excess of 30 atmospheres, the use of such pressure is economical and constitutes a preferred mode of operation. The maximum pressure which may be used is dictated by the mechanical limitations of the equipment used. For practical reasons, pressures above 5000 atmospheres are generally not used and this constitutes a practical upper limit of pressure.

Because the reaction is highly exothermic, it is preferred to operate in the presence of a liquid reaction medium, which besides aiding in the dissipation of the heat of reaction also functions to bring about better catalyst contact, and hence improves the efficiency of the process. Suitable media are water and such organic compounds as cyclohexane, methanol, propanol, decahydronaphthalene, tetrahydronaphthalene, benzene, toluene, xylene, cyclohexanone, methyl isobutyl ketone, etc.

The reaction medium can occupy up to 60% or as little as 5% of the reactor volume. Generally, however, in batch operation the reaction medium occupies between 25% and 50% of the reactor volume.

The time of reaction depends upon such interdependent variables as temperature, pressure, and amount and type of catalyst used. Under preferred conditions for batch operation, the reaction reaches essential completion in from 3 to 20 hours.

The amount of catalyst used depends upon the temperature and pressure used, the method of operation selected, catalyst activity, etc. As a rule in batch operation it will be between 1.5 and 30%, and preferably between 2.5 and 20% by weight of the reaction medium. In continuous operation, the weight of product in the reaction at any one time is ordinarily less than the weight of catalyst, but the total weight of material processed during the active life of the catalyst is usually at least 10 times the catalyst weight.

The surface of the reactor in contact with the reactants appears to be a factor in determining the molecular weight and yield of high molecular weight hydrocarbons obtained from carbon monoxide. Silver and stainless steel are satisfactory materials.

The catalysts of this invention make it possible to convert carbon monoxide to normally solid, high molecular weight hydrocarbons having properties which make them outstandingly useful for conversion to films and fibers. In the table below are summarized the physical properties of these products determined on composite samples synthesized at 225° C. and 275° C. In the table "TS" refers to tensile strength in p.s.i., and "elong." to elongation at break in percent.

Table

| Synthesis temperature | 225° C. | 275° C. |
|---|---|---|
| Inherent viscosity | 2.8 | 1.6 |
| Density | 0.97 | 0.95–0.96 |
| 20-mil film, TS/elong. (p.s.i. percent) | 3,500/622 | 3,750/50 |
| 5-mil film, TS/elong. (p.s.i. percent) | 3,775/180 | 3,900/33 |
| Stiffness, p.s.i | 122,000 | 130,000 |

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows.

We claim:

1. Phosphomolybdic acid from the class represented by the formula $P_2Mo_{20-24}O_{2-60}$ and wherein the average valence of the molybdenum is not more than 4.

2. Phosphomolybdic acid represented by the formula $P_2Mo_{22}O_{39}$.

3. Phosphomolybdic acid represented by the formula $P_2Mo_{24}O_{17}$.

4. Phosphomolybdic acid represented by the formula $P_2Mo_{21}O_{47}$.

5. Phosphomolybdic acid represented by the formula $P_2Mo_{22}O_{42}$.

6. Phosphomolybdic acid from the class represented by the formula $P_2Mo_{20-24}O_{2-37}$ and wherein the average valence of the molybdenum is not more than 4.

References Cited in the file of this patent

UNITED STATES PATENTS

| | | |
|---|---|---|
| 2,503,991 | Bechtold | Apr. 11, 1950 |
| 2,599,326 | Gruen | June 3, 1952 |
| 2,652,372 | Farlow | Sept. 15, 1953 |
| 2,714,583 | Fawcett | Aug. 2, 1955 |
| 2,726,218 | Arnold | Dec. 6, 1955 |
| 2,749,318 | Osthoff | June 5, 1956 |
| 2,788,258 | Arnold et al. | Apr. 9, 1957 |

OTHER REFERENCES

Mellor: "Comprehensive Treatise on Inorganic and Theoretical Chemistry," Longmans, Green and Co., New York, 1923, vol. 11, pages 660 and 661.

Hoffman: "Lexikon der Anorganischen Verbinsungen," Band II, Nos. 56–81, page 708 (1912–1914).